United States Patent [19]

Schnetzka, II et al.

[11] Patent Number: 4,864,487
[45] Date of Patent: Sep. 5, 1989

[54] CONTROL FOR THREE TERMINAL POWER SEMICONDUCTOR DEVICES

[75] Inventors: Harold R. Schnetzka, II, Spring Grove; Frank E. Wills, York, both of Pa.

[73] Assignee: York International Corporation, York, Pa.

[21] Appl. No.: 291,776

[22] Filed: Dec. 29, 1988

[51] Int. Cl.⁴ .............................................. H02P 13/24
[52] U.S. Cl. ...................................... 363/129; 363/87; 323/320; 323/326
[58] Field of Search ................... 363/84, 85, 87, 128, 363/129, 160, 161, 164; 323/320, 322, 326, 237, 242

[56] References Cited

U.S. PATENT DOCUMENTS

| | | | |
|---|---|---|---|
| 4,042,873 | 8/1977 | Cox | 363/129 |
| 4,156,275 | 5/1979 | Loberg | 363/87 |
| 4,309,749 | 1/1982 | Weibelzahl et al. | 363/87 |
| 4,315,305 | 2/1982 | Siemon | 363/88 |
| 4,348,718 | 9/1982 | Vollrath | 363/87 |
| 4,351,022 | 9/1982 | Dolland et al. | 363/87 |
| 4,455,598 | 6/1984 | Andre | 363/87 |
| 4,463,415 | 7/1984 | Vollrath | 363/87 |
| 4,499,534 | 2/1985 | Schnetzka et al. | 363/129 |
| 4,523,267 | 6/1985 | Mehl | 363/87 |
| 4,586,121 | 4/1986 | Gilliam | 363/129 |
| 4,630,188 | 12/1986 | Daggett | 363/129 |

OTHER PUBLICATIONS

"Thyristor DC Motor Drive with Simple Phase Locked Equidistant Pulse Generation" by Alden et al., IEEE No. CH1583, 1980.
"A Simple Equidistant Firing Delay Scheme for 3-Φ Thyristor Converters" by Bhat et al., Int. J. Electronics, 1979, vol. 47, No. 2, 139-145.

Primary Examiner—Peter S. Wong
Attorney, Agent, or Firm—Finnegan, Henderson, Farabow, Garrett & Dunner

[57] ABSTRACT

A control circuit for generating gating signals to drive the SCRs of an AC switch coupled between a three phase AC source and a three phase load. A reference voltage signal is derived from the source and, after filtering, is applied to a squaring amplifier. The amplifier output is applied to a phase-locked loop (PLL). The output signal of the voltage controlled oscillator (VCO) of the PLL is fed back to the phase comparator thereof via two dividing counters. The output of one counter is applied to a logic block for generating a ramp reset signal in phase with a selected source phase-to-neutral voltage. The ramp reset signal is applied to a ramp forming circuit the output of which is applied to a first input of a comparator. The comparator receives a DC control voltage on its second input and provides on its output a gating signal corresponding to the source selected phase. Alternate pulses of that gating signal are separated to form two selected phase gating signals that are respectively applied as data inputs to two shift registers. The shift registers receive the VCO output as a clock signal and the remaining gating signals are provided, with appropriate phase delay, on the shift register outputs.

32 Claims, 6 Drawing Sheets

CONTROL FOR THREE TERMINAL POWER SEMICONDUCTOR DEVICES

The present invention relates in general to a control circuit for controlling the conduction angles of three-terminal power semiconductor devices and, more specifically, to a control circuit for controlling the gating of silicon controlled rectifiers (SCRs) coupled between a three phase AC power source and a load.

BACKGROUND OF THE INVENTION

The use of three-terminal power semiconductor devices in rectifier or AC switching circuits is well known in the art. Three-terminal power semiconducting devices as used herein refers to the class of devices including SCRs, thyristors and bipolar transistors that are rated for conducting load currents and controllable to operate in the conducting state by application of a control signal to a third terminal of the device. While for clarity of explanation the ensuing discussion is directed in particular to SCRs, it is understood to be equally applicable to three-terminal devices in general.

With respect to rectifier circuits such as may be constructed with SCRs, the SCRs are typically connected as a three phase, full wave rectifier bridge consisting of three pairs of SCRs, in which a different pair of SCRs is connected to rectify the AC voltage of a different phase of a three phase AC source. A DC voltage is provided on the output of the rectifier circuit, the amplitude of the DC output voltage and the power delivered to an electrical load connected to the rectifier output being controlled by controlling the respective conduction angles of the SCRs. More specifically, each SCR can conduct during the half cycle of the AC source phase that causes the SCR anode to be positive with respect to its cathode. However, the SCR does not conduct unless a gate signal is applied to the third or gate terminal of the SCR. Thus, upon so applying the gate signal, the SCR provides a conductive path between its cathode and anode terminals, i.e., the SCR turns on, and remains conductive so long as the anode current through the SCR is above the holding current specification of the SCR device. The application of the gate signal causing the SCR to conduct is variously referred to in the art as turning on, firing or triggering the SCR.

Conduction angle as used herein refers to the portion, in degrees, of the 180 degree half cycle of the power source phase applied to the SCR during which the SCR conducts. Typically, the SCRs are turned on during the source voltage phase half cycle and remain conductive for the duration of the half cycle. In such a case, the conduction angle is measured relative to the next zero crossing of the AC phase voltage applied to the SCR. As a result, as the SCR is turned on later during the half cycle, the conduction angle becomes shorter. Further, as the conduction angle decreases, a lower DC voltage is generated on the rectifier circuit output. A load for such a rectifier circuit can typically comprise an inverter that is in turn connected to supply power to an AC load, e.g., an AC motor. Thus, control of the SCR conduction angles in the rectifier circuit provides means for controlling operation of the AC load.

Three-terminal power semiconductor devices, such as SCRs, are also applied to construct an AC switch that is used to regulate directly the power flow to an AC load. An AC switch is typically constructed with a different pair of SCRs connected between each phase of a three phase AC source and a corresponding phase connection of a three phase AC load, e.g., a three phase motor. As is known, with respect to each pair of SCRs, the two SCRs are connected in parallel with the anode of one device connected to the cathode of the device with which it is paired. As a result, one of the SCRs can be turned on to conduct during each half cycle of the AC source phase with which they are associated. Regulation of the power delivered to the AC load is achieved by controlling the conduction angles of the respective SCRs of the AC switch.

The control circuits known in the art, for generating gating signals to control three-terminal device operation in rectifier or AC switch circuits, must operate in phase with the AC source since the conduction angle of each SCR is, typically, measured relative to the zero crossing of the associated phase voltage of the AC source. In order to achieve such in-phase operation, an an AC reference signal is derived from at least one phase, and in some cases all three phases, of the AC source, each reference signal being used for generation of the gating signals. An exemplary SCR control circuit, for generating signals to control the SCRs of a rectifier or AC switch, is disclosed in commonly assigned U.S. Pat. No. 4,499,534, the disclosure of that patent being incorporated in its entirety herein by reference. The control circuit disclosed in that patent uses an AC reference voltage signal derived from a single phase of the three phase AC source and from that reference signal generates the gating signals applied to the SCRs connected to all three phases of the AC source.

In particular, the control circuit disclosed in the '534 patent includes three separate ramp forming circuits that are respectively controlled by signals generated from the reference voltage, the three ramp circuits being respectively associated with the three phases of the AC power source. Each of the three ramp signals generated by the ramp circuits is applied to a separate comparator circuit concurrent with a DC control voltage proportional to the power to be transferred to the load. Each ramp circuit generates a ramp shaped waveform that declines from an initial voltage value determined by a reference voltage, the rate of decline being determined by the integrator circuit of the ramp circuit. If the rates of decline of the three ramp circuits are not identical to one another, the durations of the respective gating signals generated therefrom will vary. Such differences in gating signal durations, i.e., differences in the conduction angles of the respective SCRs, will result in unbalanced load current, such unbalanced currents being undesirable due to their adverse effect on operation of the load.

In addition to the above disadvantage, the control circuit disclosed in the U.S. Pat. No. 4,499,534 requires ramp reset circuitry comprising a plurality of digital counters to generate signals for controlling operation of the three separate ramp circuits so that the generated ramps have a phase relationship corresponding to the three phases of the AC source. Such ramp reset circuitry, in addition to the three ramp circuits and three corresponding comparator circuits, contribute to the overall parts count of the control circuit, it being desirable from an economic standpoint to minimize the circuit parts count. Further, the overall circuit reliability can decline with increasing parts count. A further disadvantage of employing that control circuit is the expenditure of labor required to calibrate the ramp circuits. An additional disadvantage derives from the possibility that, over time, the operation of the separate ramp and comparator circuits may become unbalanced due to drift in device characteristics.

SUMMARY OF THE INVENTION

It is an object of the present invention to provide an improved control circuit for driving into conduction three terminal semiconductor devices coupled between a three phase AC source and a load.

Another object is to provide such a control circuit which utilizes a single ramp circuit and a single comparator circuit.

Yet another object is to provide such a circuit which is less expensive and more reliable than that in the prior art.

Still another object is to provide such a circuit which is preferably designed to regulate the power flow to an AC motor used in an air conditioning system for industrial application.

To achieve the object and in accordance with the purpose of the invention, as embodied and described herein, the invention is directed to a control circuit for selectively driving into conduction power semiconductor devices coupled between a polyphase AC power source and an electrical load in order to regulate power flow from the AC power source to the load according to a DC control voltage, each semiconductor device being driven into a conduction mode by applying a driving signal to a control terminal of each respective semiconductor device. The control circuit comprises reference voltage means coupled to the polyphase source for generating a reference voltage waveform corresponding to a selected phase of the polyphase source, the reference voltage waveform having a predetermined phase relation to the selected phase of the polyphase source; means, coupled to the reference voltage means, for generating a square wave signal in phase with the reference voltage waveform; a phase-locked loop coupled to receive the square wave signal and provide a timing reference signal in phase with the square wave signal, the timing signal having a frequency that is a predetermined multiple of the frequency of the polyphase source; ramp forming means coupled to the square wave signal generating means for generating a single ramp-shaped voltage signal in phase with the selected phase of the polyphase source; means for comparing the single ramp-shaped signal and the DC control voltage and generating during each cycle of the ramp-shaped signal a data pulse having a duration corresponding to a predetermined relationship between the ramp-shaped signal and the DC control voltage, the data pulse being a driving signal associated with the selected phase; and shift register means, coupled to receive the data pulses from the comparing means and the timing signal from the phase-locked loop, for generating a plurality of driving signals respectively associated with remaining phases of the polyphase source exclusive of the selected phase, each of the plurality of driving signals being generated in accordance with the timing signal to have a predetermined phase delay relative to the received data pulse and corresponding to the remaining phase of the source with which that driving signal is associated.

The control circuit of the present invention can take the form of several embodiments, two of which are disclosed in greater detail in this application.

The accompanying drawings which are incorporated in and constitute a part of this specification, illustrate two embodiments of the invention and, together with the description, serve to explain the principles of the invention.

DESCRIPTION OF THE PREFERRED EMBODIMENT

Figures 1, 6:
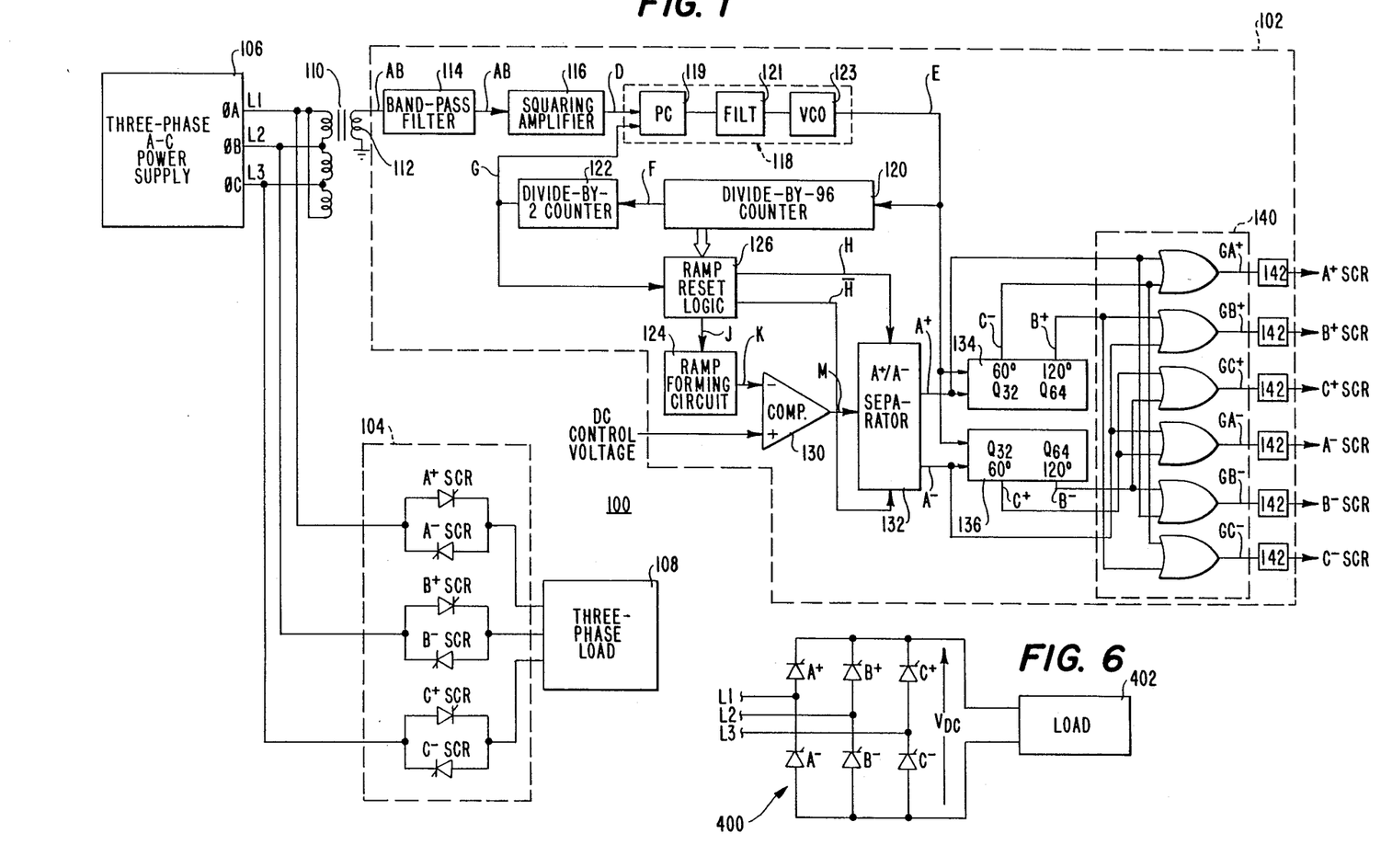
FIG. 1 illustrates a power delivery system including a control circuit constructed in accordance with a first embodiment of the present invention.
FIG. 6 illustrates a full wave bridge rectifier circuit comprising SCRs that can be driven with the control circuit of the present invention.

Referring now to the drawings, FIG. 1 illustrates a power delivery system 100 including a control circuit 102, constructed in accordance with the present invention, for generating gating signals for driving into conduction six SCRs of an AC switch 104 connected between a three phase AC power supply 106 and a three phase load 108. Control circuit 102 operates to control the conduction angles of the respective SCRs of the AC switch to deliver power to the load in accordance with a DC control voltage signal.

Figure 2:
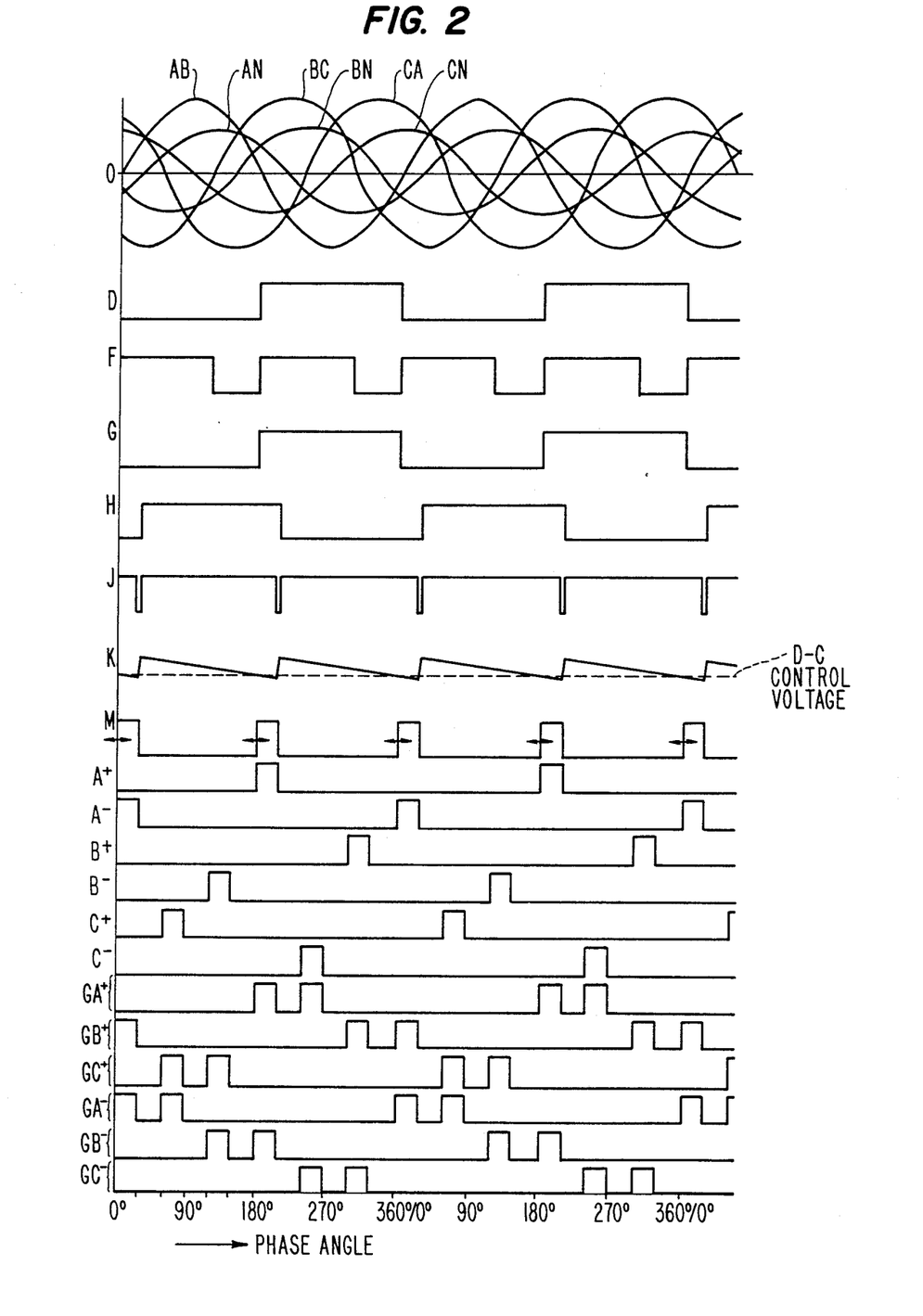
FIG. 2 illustrates a plurality of signal waveforms occurring in the system illustrated in FIG. 1.

FIG. 2 illustrates the waveforms of various signals occurring in system 100 and also illustrates respective line-to-neutral voltage waveforms AN, BN and CN of the A, B and C lines of power supply 106. FIG. 2 also illustrates the waveforms of the line-to-line voltages between lines L1 and L2, L2 and L3, and L3 and L1, respectively designated AB, BC and CA. As is well known, the three line-to-neutral voltages are phase displaced from one another by 120 degrees as are the three line-to-line voltages. Further, each line-to-neutral voltage lags by 30° its associated line-to-line voltage when the phase rotation is A-B-C. Specifically, voltage waveform AN lags waveform AB by 30°, waveform BN lags waveform BC by 30°, and waveform CN lags waveform CA by 30°.

Referring again to FIG. 1, a reference voltage waveform is derived from power supply 106 by a transformer 110. The primary winding of transformer 110 is delta connected. A secondary winding 112 from which the reference voltage waveform is derived is coupled to the primary winding connected across conductors L1 and L2, so that the reference waveform is in phase with the power supply voltage waveform AB. The presence of waveform AB on secondary winding 112 of transformer 110 is indicated in FIG. 1 as is, generally, the locations within control circuit 102 of various other signal waveforms illustrated in FIG. 2.

Control circuit 102 includes band-pass filter means for filtering the reference voltage waveform. As embodied herein, the filter means comprises a band-pass filter 114, to which the reference voltage waveform is applied, that is tuned to the fundamental frequency of power supply 106 to eliminate undesirable harmonics and transients that may be present in the power supply voltage. It is assumed that the fundamental frequency of the power supply is 60 Hz although system 100 can be constructed for operation with other power supply voltages as may be encountered in different geographic areas. The band-pass filter is preferably constructed by cascading low-pass and high-pass filters, with the high-pass filter preceding the low-pass filter. By its operation, band-pass filter 114 introduces negligible phase shift in the reference voltage waveform, so that the waveform outputted thereby is indicated as AB in FIG. 1.

Control circuit 102 also includes means, operatively coupled to the filter means, for generating a square wave signal in phase with the reference voltage waveform. As embodied herein, the square waveform signal generating means comprises a squaring amplifier 116, to which the band-pass filter output is applied, that is preferably provided in the form of a Schmitt trigger circuit. Amplifier 116 detects each zero crossing of the filtered reference waveform applied thereto and effects a transition in the square wave generated thereby in response to each detected zero crossing. The square wave is illustrated as a waveform D in FIG. 2 and is in phase with the AB waveform.

The square wave output of squaring amplifier 116 is applied to a phase-locked loop (PLL) 118 that can be of a standard construction, i.e., comprising a phase comparator (PC) 119, a lag-lead filter 121 and a voltage controlled oscillator (VCO) 123. Thus, waveform D is applied to a first input of the phase comparator of the PLL. The VCO of the PLL outputs a square wave E having a frequency which is n times the frequency of square wave D, where n is determined by the division magnitude chosen in the feedback loop of the PLL. In a preferred embodiment, square wave E has a frequency of 11,520 Hz when the AC power supply frequency is 60 Hz. In the preferred embodiment, waveform E is fed back to a second input of the phase comparator of the PLL via a divide-by-96 ripple counter 120 and a divide-by-2 counter 122. Waveforms F and G, respectively outputted by counters 120 and 122 are illustrated in FIG. 2. As can be seen, waveform G is, by operation of the PLL, in phase with and otherwise identical to waveform D.

Control circuit 102 further includes means for generating a ramp-shaped analog voltage signal. As embodied herein, the ramp-shaped signal generating means is provided as a ramp forming circuit 124. In accordance with the embodiment of the invention illustrated in FIG. 1, it is desired to drive ramp forming circuit 124 to generate a ramp waveform K that is in phase with the voltage waveform AN and has a frequency that is two times that of waveform AN. That is, the ramp is reset at each zero crossing of the AN waveform. Circuit 102 therefore includes a logic circuit 126 that generates a ramp reset signal J that, when applied to ramp forming circuit 124, causes generation of ramp waveform K.

Control circuit 102 additionally includes means for comparing the ramp-shaped analog signal and the DC control voltage. As embodied herein, the comparing means is provided as a comparator 130. Ramp waveform K is applied to an inverted input(−) of comparator 130, the non-inverted input(+) of which is connected to receive the DC control voltage signal proportional to the magnitude of power to be delivered to load 108. In response to these inputs, comparator 130 generates a square waveform M on its output, the alternate pulses of which respectively correspond to SCR gating signals A+ and A− for the positive and negative half cycles, respectively, of the AN waveform. Waveform M and gating signals A+ and A− are illustrated in FIG. 2.

It is necessary to separate the alternate pulses of the M waveform in order to have separate access to the A+ and A− waveforms. To this end, control circuit 102 yet further includes separator means for separately providing the phase A positive and negative half cycle driving signals. As embodied herein, the separator means is provided as an A+/A− separator circuit 132. The M waveform is applied to A+/A− separator circuit 132 that is also coupled to receive steering waveforms H and $\overline{H}$ that facilitate the generation of the A+ and A− waveforms from the M waveform. The waveforms H and $\overline{H}$ are generated by logic circuit 126, the construction of that logic block and separator circuit 132 being described more fully below.

Control circuit 102 yet additionally includes shift register means that, as embodied herein, are provided as shift registers 134 and 136. Waveforms A+ and A− are generated on outputs of separator circuit 132 and respectively applied as data inputs to shift registers 134 and 136. Each shift register 134,136 is also coupled to receive waveform E as a clock input. Each of the shift registers operates as a digital delay line to provide on selected outputs thereof, in accordance with delay measured by waveform E, gating signals for the SCRs connected to the remaining B and C phases of power supply 106. Specifically, shift register 134 provides C− and B+ gating signals respectively corresponding to the negative and positive half cycles of waveforms CN and BN of the power supply. Gating signals C− and B+ are respectively generated to lag the A+ gating signal by 60° and 120° phase angles, these lagging phase angles corresponding to the phase relationship between the AN, BN and CN waveforms as illustrated in FIG. 2. In similar fashion, shift register 136 provides C+ and B− gating signals respectively corresponding to the positive and negative half cycles of waveform CN and BN of the power supply. Gating signals C+ and B− are respectively generated to lag the A− gating signal by 60° and 120°. The manner in which shift registers 134 and 136 provide the B+, B−, C+ and C− gating signals with appropriate phase delays is described more fully below.

The gating signals provided by separator circuit 132 and shift registers 134 and 136 are applied to a double pulsing logic block 140 comprising a plurality of OR gates coupled to receive the six gating signals A+ through C−. The double pulsing logic is implemented to generate a modified set of gating signals, designated herein as GA+, GB+, GC+, GA−, GB− and GC−, that cause simultaneous gating of the SCRs of two different phases to ensure provision of complete conductive paths between the power supply and load. Since such double pulsing logic is well known in the art and further described in the above incorporated patent, it is not described further herein. The gating signals GA+ through GC − are applied to a set of SCR gate drivers 142 that are connected to the respective gates of the SCRs comprising AC switch 104, those six SCRs being designated "A+SCR" through "C−SCR" in FIG. 1. Gating signals GA+ through GC− are illustrated in FIG. 2 and as seen therein, cause simultaneous gating of the SCRs of two different phases at one time. For example, a first gating signal GA+ occurs simultaneously with a gating signal GB—, while a second gating signal GA+ occurs simultaneously with a gating signal GC—.

Preferred constructions of logic circuit 126, divide-by-96 counter 120 and divide-by-2 counter 122 are described next with respect to FIG. 3. Since the square waveform E output of PLL 118 is in phase with waveform AB and counter 120 is coupled to receive waveform E as generated by the PLL, signals output by counter 120 are also in phase with waveform AB. However, logic circuit 126 is constructed to generate the ramp reset signal in phase with waveform AN that lags waveform AB by 30 degrees.

Figure 3:
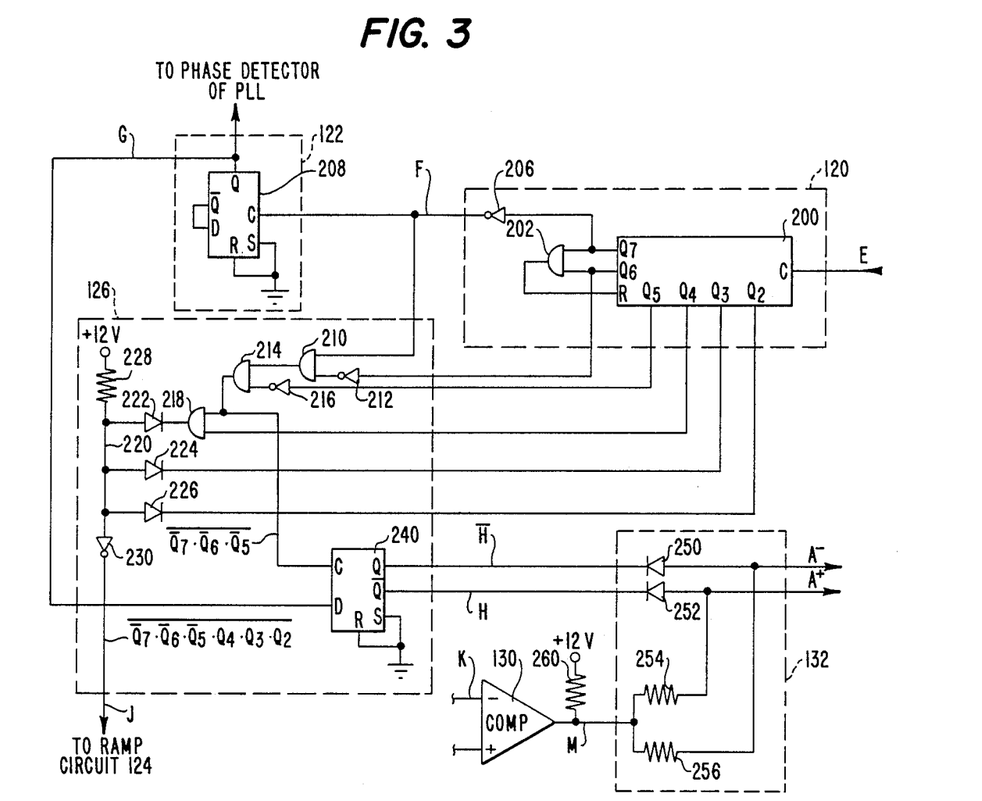
FIG. 3 illustrates in greater detail the construction of portions of a logic circuit illustrated in FIG. 1.
Figure 4:
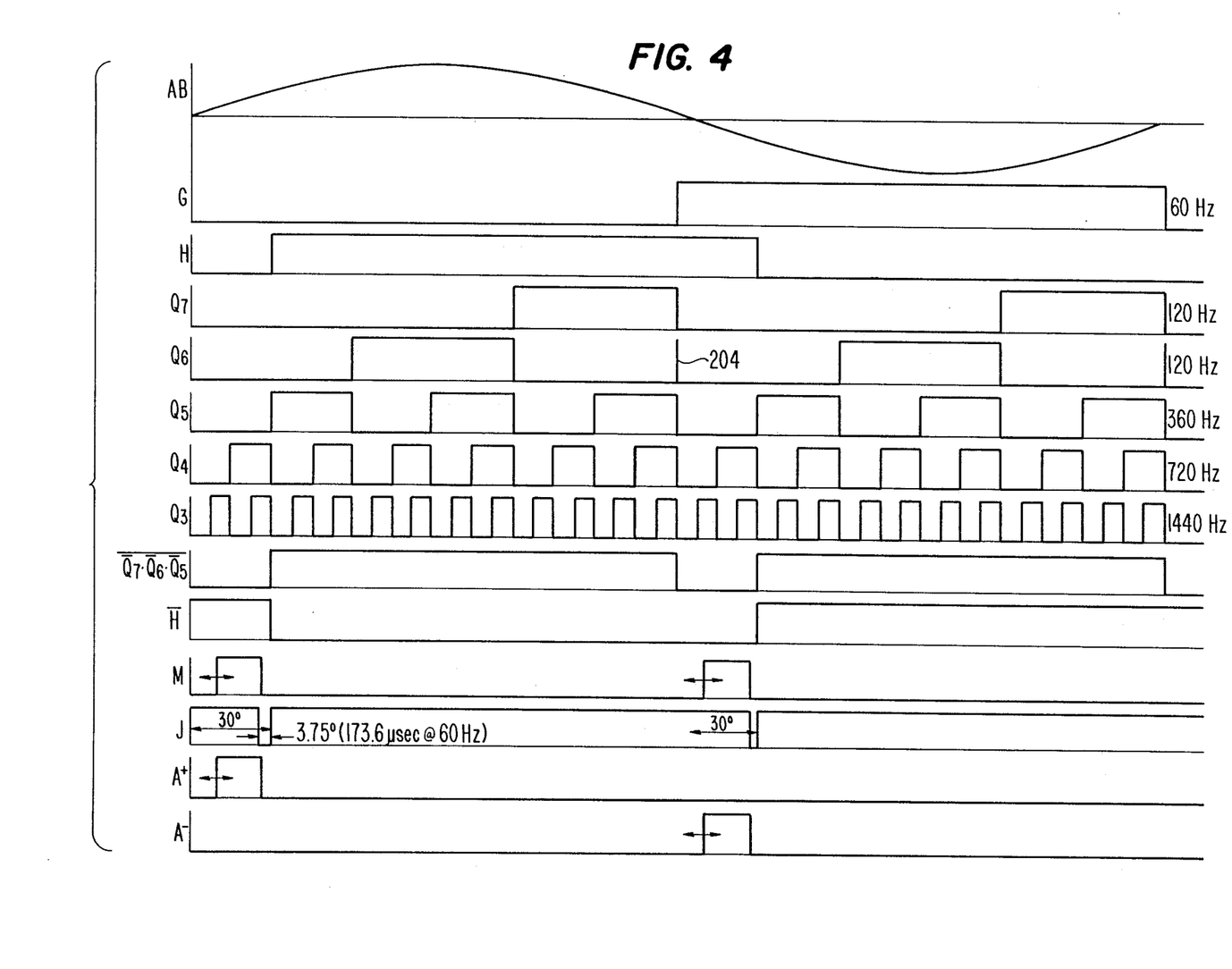
FIG. 4 illustrates a plurality of signal waveforms occurring in the logic circuit illustrated in FIG. 3.

Referring to FIG. 3, counter 120 is preferably constructed from a 7-stage ripple counter 200 such as a Motorola MC14024 BCL counter. Counter 200 has a clock input C coupled to receive square waveform E, a reset input R and outputs $Q_2$ through $Q_7$ on which are generated waveforms in phase with waveform E but having frequencies that are predetermined fractions of waveform E. Selected waveforms germane to the operation of counter 120 are illustrated in FIG. 4. The square waveform generated on output $Q_2$, not shown in FIG. 4, has a frequency that equals the frequency of waveform E divided by $2^2$, i.e., 2880 Hz. The square waveforms generated on output $Q_3$, $Q_4$ and $Q_5$ of counter 200 are illustrated in FIG. 4 and have respective frequencies equal to the frequency of waveform E divided by $2^3$, $2^4$ and $2^5$, i.e., 1440, 720 and 360 Hz, respectively. Outputs $Q_6$ and $Q_7$ that would otherwise generate waveforms having frequencies that further halve the frequency of waveform E, are applied to an AND gate 202 the output of which is applied to the reset input R of counter 200. As seen in FIG. 4, the AND logic is satisfied upon a positive edge of the $Q_6$ output waveform, such as the edge labelled 204, that is concurrent with the $Q_7$ output waveform having a positive value. Since counter 200 is reset at the instant the AND gate 202 logic is satisfied, the $Q_6$ and $Q_7$ output waveforms are terminated and the resulting waveforms generated on outputs $Q_6$ and $Q_7$ each have a frequency equal to 120 Hz. Further, the $Q_7$ output waveform is in phase with waveform AB.

Figure 5:
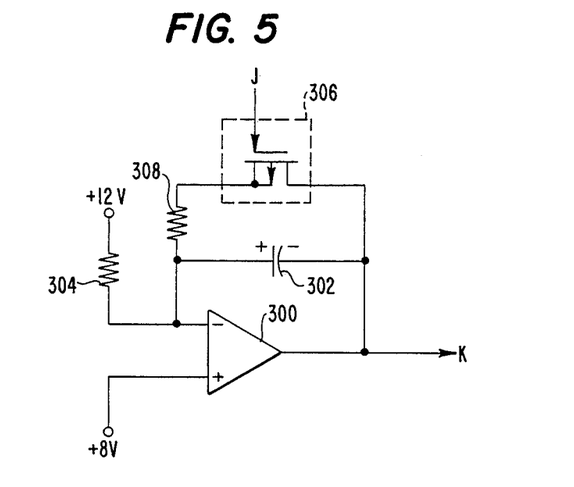
FIG. 5 illustrates a preferred construction of a ramp forming circuit.

Various constructions of ramp forming circuits are known in the art and suitable for practice with the present invention, a preferred construction being illustrated in FIG. 5 and comprising an operational amplifier 300 having an integrating capacitor 302 connected in a feedback path from the amplifier output to its inverted input(—). The inverted input is further connected to a first positive voltage supply, e.g., +12 V, through a resistor 304, capacitor 302 and resistor 304 forming an integrating circuit. The non-inverted(+) amplifier input is connected to a second positive voltage supply, e.g., +8 V, having a lower magnitude than the first supply. A switch 306, e.g., a MOSFET device, connected to shunt the integrating capacitor and responsive to the ramp reset signal, is closed when the ramp reset signal is at a low logic level and open when that signal is at a high logic level. A resistor 308 is provided in series with switch 306 to limit initial current flow upon switch closure.

Upon closing switch 306, the capacitor is shunted and becomes uncharged, so that the voltage on the output of amplifier 300 is substantially constant and equal to the voltage applied to its non-inverted input. While the switch is closed, current flows through resistor 304 from the +12 V power supply to cause the voltage at the amplifier inverted input to equal the non-inverted input voltage. When the switch is open, the current flowing through resistor 304 charges capacitor 302 with the illustrated polarity so that as the capacitor charges, the voltage on the amplifier output declines, corresponding to the declining portion of waveform K. As seen in FIG. 4, the ramp reset signal is in a low logic state for a very short period, i.e., 3.75°, sufficient only to reset the ramp signal, the ramp signal commencing its declination upon the ramp reset signal returning to the high logic state.

Referring again to FIG. 3, the $Q_7$ output waveform is inverted by an inverter 206 and applied as waveform F to divide-by-2 counter 122. The latter counter is preferably provided as a flip-flop circuit 208 such as a Motorola MC14013BCL flip-flop. Flip-flop 208 of counter 122 receives waveform F on its clock input and generates waveform G on its Q output, the remaining terminals of the flip-flop being connected as shown in FIG. 3.

Logic circuit 126 includes an AND gate 210 coupled to receive the inverted $Q_7$ output waveform on one input and the $Q_6$ output waveform via an inverter 212. An AND gate 214 receives the output of AND gate 210 on one of its inputs and receives the $Q_5$ output waveform via an inverter 216. An AND gate 218 receives the output of AND gate 214 on one of its inputs and the $Q_4$ output waveform on its other input. The output of AND gate 218 is connected to a node 220 through a diode 222, the $Q_3$ and $Q_2$ output waveforms also being connected to that node through diodes 224 and 226, respectively. Node 220 is connected to a +12 V source through a pull-up resistor 228. Ramp reset signal J is derived from node 220 via an inverter 230. The above-described configuration of logic elements comprising logic circuit 126 and applied to form signal J corresponds to the following Boolean expression:

$$\text{signal } J = \overline{\overline{Q_7} \cdot \overline{Q_6} \cdot \overline{Q_5} \cdot Q_4 \cdot Q_3 \cdot Q_2}$$

As seen in FIGS. 2 and 4, signal J so generated from the outputs of ripple counter 200 and logic elements of logic circuit 126, lags waveform AB by 30° and occurs upon each zero crossing of waveform AN.

Preferred constructions of the portion of logic circuit 126 for generating steering signals H and $\overline{H}$ and separator circuit 132 are described next. Logic circuit 126 includes a flip-flop circuit 240, such as a Motorola MC14013BCL flip-flop, coupled to receive the output of AND gate 214 on its clock input and waveform G on its D input. With the set (S) and reset (R) terminals connected to ground, flip-flop 240 operates as a positive edge transition device. That is, upon receiving the positive edge of the clock signal: if the signal present on the D input is at a low logic level, then the Q output is driven low; and if the signal present on the D input is at a high logic level, then the Q output is driven high. The output waveform of AND gate 214 applied to the flip-flop 240 clock input, corresponds to the Boolean expression:

$$\overline{Q_7} \cdot \overline{Q_6} \cdot \overline{Q_5}$$

and is illustrated in FIG. 4. Waveform G is also illustrated in FIG. 4. As can be seen, square waveform signals H and $\overline{H}$ are respectively generated on the $\overline{Q}$ and Q outputs of flip-flop 240 in accordance with the above-described mode of operation of the flip-flop. The $\overline{H}$ and H signals, also illustrated in FIG. 4, are respectively applied to the cathodes of diodes 250 and 252 of separator circuit 132. The separator circuit is further coupled to receive square waveform signal M outputted by comparator 130, that signal being applied to two resistors 254 and 256 connected at one end in parallel to receive signal M. The other ends of resistors 254 and 256 are connected to the anodes of diodes 250 and 252, respectively, these connections being tapped as the A− and A+ gating signal outputs of separator circuit 132. As is also seen in FIG. 3, the output of comparator 130 is connected to a +12 V supply through a pull-up resistor 260. Separator circuit 132 so constructed and coupled to receive the M, H and $\overline{H}$ signals, operates to perform an AND logic operation between the three received signals. Thus, as seen in FIG. 4, when the M and $\overline{H}$ occur simultaneously, the A− signal is outputted by separator circuit 132. Further, when the M and H signals occur simultaneously, the A+ signal is generated by the separator circuit.

As described above, the A+ and A− signals, which are gating signals respectively corresponding to the positive and negative half cycles of power supply waveform AN, are applied as data inputs to shift registers 134 and 136 (FIG. 1), respectively. Also as described above, both shift registers are connected to receive waveform E as a clock input. The two shift registers are preferably provided as a Motorola MC14517BCL dual 64-bit static shift register, the two 64-bit registers of that circuit being implemented separately as shift registers 134 and 136 herein. The 64-bit length of each shift register as implemented herein corresponds to 120° of the power supply voltage waveforms. The 120° portion of the 60 Hz power supply cycle corresponds to approximately 5.55... milliseconds $$\left( = \frac{120°}{360°} \times \frac{1}{60 \text{ Hz}} \right)$$

The clock of 11,520 Hz corresponds to 86.8 microseconds per clock tick, or bit shift, in the shift register. Thus, 64 clock ticks, i.e., one complete shift through the 64 bits of the shift register, correspond to 5.55... milliseconds (=64 bits ×86.8 microseconds/bit shift) or 120°. The resolution provided by each shift register is 1.875° per bit (=120°/64 bits).

Since the entire 64 bits of each shift register correspond to a 120° phase delay, the signal provided on a $Q_{64}$ output of each shift register, corresponding to the 64th bit position, lags the signal applied to the shift register data input by 120°. Further, the signal provided on a $Q_{32}$ output of each shift register, corresponding to the 32nd bit position, lags the signal applied to the shift register data input by 60°. Thus, with the A+ gating signal applied to the data input of shift register 134, the C− and B+ gating signals are respectively provided on the $Q_{32}$ and $Q_{64}$ outputs of that shift register. Similarly, with the A− gating signal applied to the data input of shift register 136, the C+ and B− gating signals are respectively provided on the $Q_{32}$ and $Q_{64}$ outputs of that shift register. Each gating signal provided on each shift register output will have substantially the same width, i.e., duration, as the applied A+ or A− signal from which it is generated.

Referring again to FIG. 1, square waveform signal M is generated by comparator 130 in response to the ramp signal and DC control voltage applied thereto. As can be seen from the illustration of these waveforms in FIG. 2, the comparator commences generating each pulse of waveform M at the time the ramp signal declines to a point where its magnitude equals the DC control voltage and ceases generation of the pulse when the ramp signal is reset. Thus, as the magnitude of the DC control voltage is increased or decreased, the width, i.e. duration, of each pulse of signal M increases or decreases, respectively. Also, since each M signal pulse terminates upon reset of the ramp signal, in synchronism with the zero crossing of waveform AN, any variation in the width of each M signal pulse occurs with respect to the occurrence time of the leading edge of the pulse. This is symbolically illustrated in FIGS. 2 and 4 by a double-ended arrow superimposed over the leading edge of each M signal pulse.

In view of the above-described manner in which the A+ and A − gating signals are generated from signal M, the respective widths of those gating signals will increase or decrease as the DC control voltage increases or decreases. As with the M signal pulse, such width variations will result from changes in the occurrence time of the leading edge of each gating signal A+ and A−. In all cases, the widths of the M, A+ and A− signals will be identical. In accordance with the operation of each shift register as described above, the remaining gating signals provided on the shift register outputs will have widths substantially identical to the width of the A+ or A− gating signal from which they are respectively generated. Each remaining gating signal is constructed to have a width that is a discrete multiple of the individual clock tick durations, i.e., 86.8 microseconds (=1/11,520 Hz) and so may not be precisely identical in width to the A+ or A− gating signal from which it is generated.

In the operation of power delivery system 100, waveform AB is derived as the reference waveform, is filtered by filter 114 and applied to squaring amplifier 116 which responsively generates square waveform D. That waveform is applied to the phase comparator of PLL 118, the VCO of which outputs waveform E, having a frequency of 11,520 Hz, that is applied to both counter 120 and shift registers 134 and 136. Counter 120 responsively generates waveform F that is fed back through counter 122 to the PLL phase comparator. A plurality of outputs from counter 120, having respective frequencies that are predetermined fractions of the frequency of waveform E, are applied to logic circuit 126 which responsively generates the ramp reset signal J. Logic circuit 126 additionally receives the output of counter 122 to generate steering signals H and $\overline{H}$. Ramp reset signal J is applied to ramp forming circuit 124 that responsively generates ramp signal K that is applied to the inverted input of comparator 130. Comparator 130 receives the DC control voltage on its noninverted input and provides signal M on its output. A+/A− separator circuit 132 receives the M signal as well as the H and $\overline{H}$ steering signals and responsively provides the A+ and A− gating signals, the latter signals respectively being applied as data inputs to shift registers 134 and 136. Shift register 134 shifts the A+ gating signal therethrough in accordance with signal E which it receives as its clock input and provides the C− and B+ gating signals on its $Q_{32}$ and $Q_{64}$ outputs with the appropriate phase delay relative to the A+ gating signal. Shift register 136 shifts the A− gating signal therethrough in accordance with signal E and provides the C+ and B− gating signals on its $Q_{32}$ and $Q_{64}$ outputs with appropriate phase delay relative to the A− gating signal. The A+, A− and remaining gating signals are provided to double pulsing logic block 140 which responsively generates the gating signals GA+ through GC−, those signals being applied via SCR gate drivers 142, to drive the respective SCRs of AC switch 104.

Thus, in accordance with the present invention as embodied in control circuit 102 illustrated in FIG. 1, only a single ramp circuit is used in generating gating signals for the control of the SCRs associated with all three phases of the AC power supply. It is further noted that since both the A+ and A− gating signals are generated in response to signal M, the latter signal being generated in response to the DC control voltage, any change in control voltage will be reflected upon generation of the next A+ or A− signal. As a result, control circuit 102 is highly responsive to changes in the DC control voltage.

It is noted that control circuit 102 may be applied, with no modification, in a power delivery system for controlling operation of the SCRs comprising a full wave bridge rectifier circuit such as circuit 400 illustrated in FIG. 6. As seen in that figure, the three phase AC supply voltage is applied to the rectifier circuit via the three lines L1, L2 and L3 from the AC supply and the rectifier circuit outputs a DC voltage that is supplied to an electrical load 402.

Figure 7:
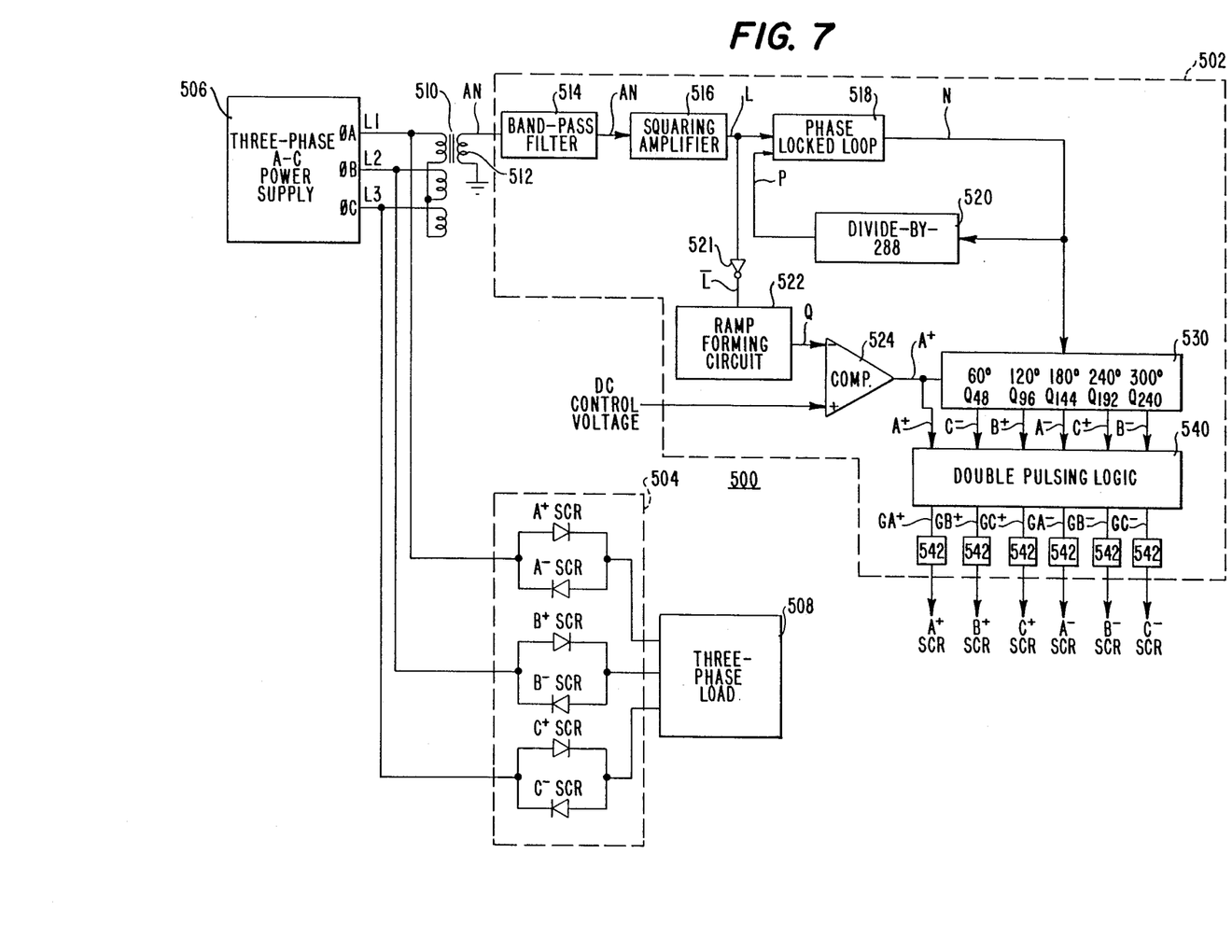
FIG. 7 illustrates a power delivery system including a control circuit constructed in accordance with a second embodiment of the present invention.

FIG. 7 illustrates a power delivery system 500 including a control circuit 502, for generating SCR gating signals, constructed in accordance with a second embodiment of the invention. The gating signals are applied to the SCRs of an AC switch 504 that is coupled between a three phase AC power supply 506 and a three phase load 508 to regulate the power flow to the load.

Figure 8:
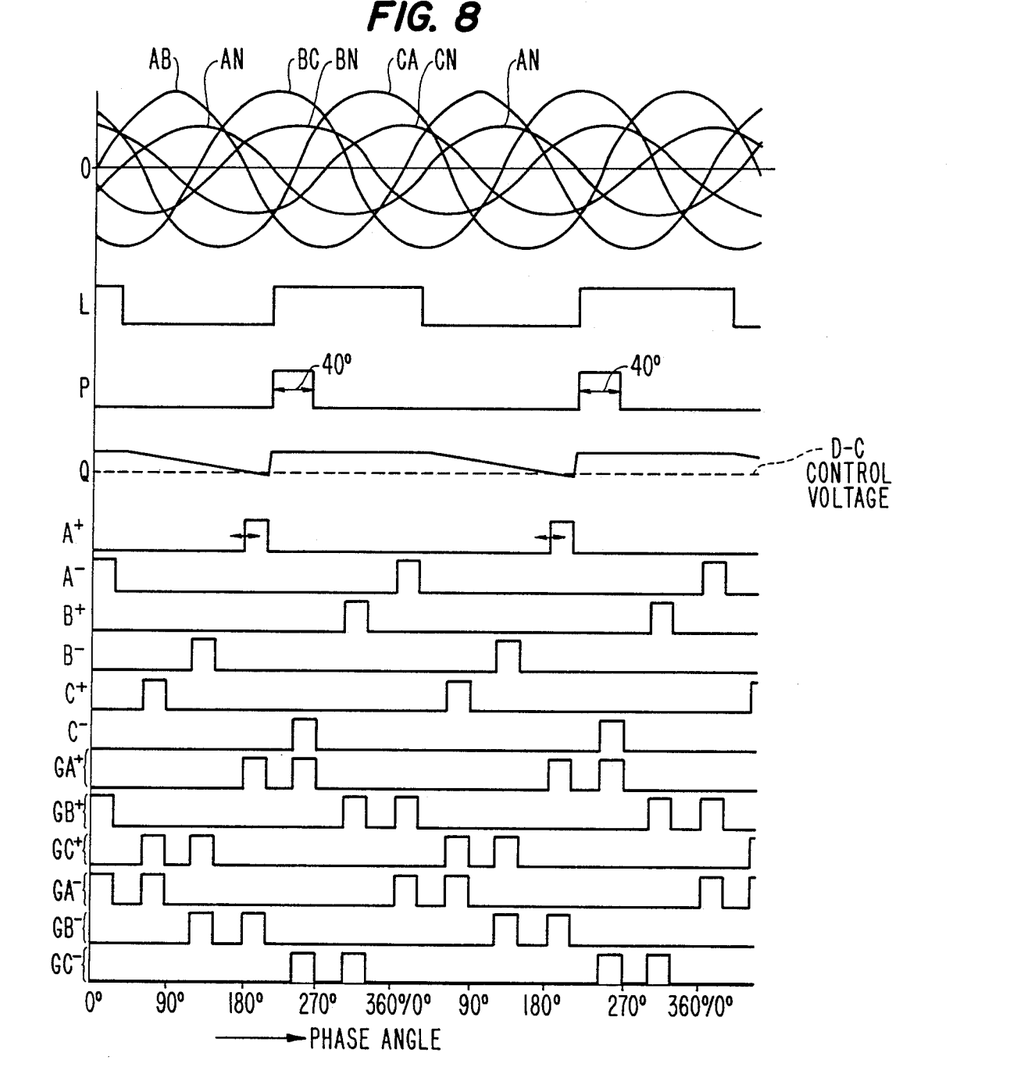
FIG. 8 illustrates a plurality of waveforms occurring in the power delivery system illustrated in FIG. 7.

A reference voltage waveform AN is derived from the power supply via a transformer 510 the primary windings of which are wye-connected. A secondary winding 512 is coupled to the primary winding corresponding to phase A of the power supply so that the waveform AN appears across winding 512. Waveform AN as well as various signals generated in control circuit 502 are illustrated in FIG. 8. Waveform AN is applied to a band-pass filter 514, the output of which is applied to a squaring amplifier 516, filter 514 and amplifier 516 being substantially the same, in construction and operation, as the above-described filter 114 and amplifier 116 of the first embodiment. The squaring amplifier outputs a square waveform L that is in phase with waveform AN, the positive portion of waveform L occurring in synchronism with the negative half cycle of waveform AN.

Waveform L is applied to a first input of a phase comparator of a PLL 518 that is identical to PLL 118 described above, except that the VCO of PLL 518 outputs a square waveform N (not illustrated) having a frequency of 17,280 Hz. The VCO output is fed back to a second input of the PLL phase comparator via a divide-by-288 counter 520. Counter 520 outputs a square waveform P that by operation of the PLL is of the same frequency and positive edge coincident to waveform L. Counter 520 can be provided as a Motorola MC14040BCL binary counter.

Waveform L outputted by amplifier 516 is applied to an inverter 521 to provide an inverted waveform $\overline{L}$ (not shown in FIG. 8) as a ramp reset signal. Waveform $\overline{L}$ is applied, as the ramp reset signal, directly to a ramp forming circuit 522, that circuit preferably being constructed as illustrated in FIG. 5. Circuit 522 is responsive to the ramp reset signal and, in accordance with the above-described operation of the preferred ramp forming circuit, generates a ramp waveform Q. Referring to FIG. 8, it is characteristic of waveform Q that it remains at a constant positive logic level during each negative half cycle of waveform AN and declines during each positive half cycle of waveform AN. Further, since waveform $\overline{L}$ is in phase with waveform AN, each resetting of the ramp signal occurs on an alternate zero crossing of waveform AN.

Referring again to FIG. 7, waveform Q is applied to the inverted (−) input of a comparator 524, the non-inverted (+) input of the comparator being connected to receive the DC control voltage. Comparator 524 operates in the same manner as comparator 130 so that a signal waveform, designated A+, is generated thereby when the magnitude of signal Q is less than or equal to the DC control voltage. Waveform A+ is the gating signal corresponding to the positive half cycle of waveform AN. The width of the A+ signal varies with the magnitude of the DC control voltage, this variation being symbolically illustrated by the double-ended arrow superimposed over each A+ gating signal. As illustrated in FIG. 8, the A+ signal terminates upon the resetting of ramp signal Q which corresponds to a zero crossing of waveform AN.

Gating signal A+ on the output of comparator 524 is applied as the data input to a shift register 530, a clock input of which is connected to receive waveform N. Shift register 530 is preferably provided as two Motorola MC14562B shift registers, each 128 bits in length, connected end-to-end to effectively provide a shift register having a 256-bit length. Each shift register provides an output at 16 bit increments along its length. For simplicity, the two registers will be treated herein as a single 256-bit register, so that a last output of the register would be designated $Q_{256}$. As illustrated in FIG. 7, outputs at every 48th bit position along the shift register are brought out to access the signals present thereon. Thus, outputs $Q_{48}$, $Q_{96}$, $Q_{144}$, $Q_{192}$ and $Q_{240}$ are brought out and gating signals C−, B+, A−, C+ and B− respectively provided thereon.

Since the single gating signal A+ is used to generate the remaining five gating signals, shift register 530 must be capable of providing the maximum phase delay associated with those gating signals. That maximum phase delay corresponds to the B− gating signal the occurrence of which lags the A+ gating signal by 300° (as seen from the AN, BN and CN waveforms in FIG. 8). Thus, the 240 bits of shift register 530 that are utilized must correspond to the 300° phase delay. The 300° portion of the 60 Hz power supply cycle corresponds to 13.8 . . . milliseconds $$\left( = \frac{300°}{360°} \times \frac{1}{60 \text{ Hz}} \right).$$

The clock rate of 17,280 Hz corresponds to 57.8 microseconds per clock tick or bit shift in the shift register. Thus, 240 clock ticks, corresponding to one complete shift through the utilized portion of shift register 530, correspond to 13.8 . . . milliseconds (=240 bit shifts×57.8 microseconds/shift) or 300°. The resolution provided by the shift register is 1.25° per bit (=300°/240 bits). Thus, the signal provided on output $Q_{240}$ of the shift register is the same as and lags the A+ gating signal by 300°. The operation of the shift register causes provision of the above-noted gating signals on outputs $Q_{48}$, $Q_{96}$, $Q_{144}$ and $Q_{192}$ to be the same as and lag the A+ gating signal by 60°, 120°, 180° and 240°, respectively. Those phase delays are appropriate for the corresponding gating signals as can be seen from the AN, BN and CN waveforms illustrated in FIG. 8. The respective widths of the gating signals provided on the shift register outputs may vary slightly from the width of the A+ signal due to the discrete nature of the shift register operation. All six gating signals A+ through C− are illustrated in FIG. 8.

Referring again to FIG. 7, gating signals A+ through C− are applied to a double pulsing logic block 540 identical to double pulsing logic block 140 illustrated in FIG. 1. Block 540 outputs modified gating signals GA+ through GC− that are respectively applied to gate drivers 542. The gate drivers are in turn connected to the respective gates of the SCRs comprising AC switch 504. As in the case of control circuit 102, control circuit 502 can be applied to control the operation of the SCRs comprising a full wave bridge rectifier such as illustrated in FIG. 6.

In the operation of power delivery system 500, waveform AN is derived as the reference waveform, is filtered by filter 514 and applied to squaring amplifier 516 which responsively generates square waveform L. That waveform is applied to the phase comparator of PLL 518, the VCO of which outputs waveform N, having a frequency of 17,280 Hz when the AC power supply frequency is 60 Hz, that is applied to both counter 520 and shift register 530. Counter 520 responsively generates waveform P that is fed back to the PLL phase comparator. Waveform L is inverted by inverter 521 and applied, as waveform $\overline{L}$, to ramp forming circuit 522 that responsively generates ramp waveform Q which is applied to the inverted input of comparator 524. The comparator receives the DC control voltage on its non-inverted input and provides the A+ gating signal on its output. That gating signal is applied to 256 bit shift register 530 as the data input and the shift register shifts that applied signal therethrough in accordance with signal N which it receives as its clock input. The remaining five gating signals B+ through C− are provided on five shift register outputs with the appropriate phase delays relative to the A+ gating signal. The A+ and remaining gating signals are provided to double pulsing logic block 540 which responsively generates the gating signals GA+ through GC−, those signals being applied, via SCR gate drivers 542, to drive the respective SCRs of AC switch 504.

While in the first embodiment of the invention, the A+ and A− gating signals are tapped from the A+/A− separator circuit and in the second embodiment the A+ gating signal is tapped from the comparator, the invention is not so limited. In either embodiment, the shift register length can be extended to provide a 360° delayed signal equivalent to the signal applied to the shift register as the data input. In this manner, the A+ and A− gating signals in the first embodiment and the A+ gating signal in the second embodiment can be derived directly from a shift register with the remaining gating signals.

While the embodiments of the present invention have been illustrated and described herein as comprising shift registers of specified length that are driven at specified clock rates, those skilled in the art will recognize that the invention may be practiced with equal effectiveness using other combinations of shift register length and clock rate.

While control circuit 102 of the first embodiment of the invention has been illustrated and described as including transformer 110 that results in the reference voltage waveform having a 30° phase shift, the invention is not so limited. Control circuit 102 can readily be modified to be practiced with a transformer such as used in control circuit 502 of the second embodiment that enables provision of a reference voltage waveform in phase with the source phase-to-neutral voltage. In such a case, logic circuit 126 would require appropriate modification since there would no longer be a phase shift between the reference voltage waveform and desired trigger signal for which to compensate. Similarly, if it was so desired, the second embodiment of the present invention could be practiced with a transformer that provides a reference voltage waveform 30° phase shifted from the desired trigger signal. The control circuit would then require phase shifting logic interposed between squaring amplifier 516 and ramp forming circuit 522 to assure the ramp signal is generated in phase with the source phase-to-neutral voltage.

While the embodiments of the present invention are illustrated for practice with a three phase AC source, those skilled in the art will recognize that the invention may be successfully practiced with any polyphase AC source. Further, as indicated above, while the illustrated embodiments of the invention employ SCRs, the invention can be practiced with any three-terminal power semiconducting devices such as are employed in rectifier and AC switch circuits. Additionally, while the control circuit of the present invention has been illustrated and described for practice with rectifier and AC switch circuits, the control circuit may be successfully applied to control three-terminal power semiconducting devices arranged in other circuit configurations.

While in both the first and second embodiments, the selected reference voltage waveform enables initial generation of at least one phase A gating signal used as data input to shift register means to derive phase B and C gating signals, the invention is not so limited. By coupling the transformer secondary to a different phase of the transformer primary winding, the reference voltage waveform can instead result in the initial generation of a phase B or phase C gating signal, that generated gating signal being applied as data input to the shift register means to cause generation of the remaining phase gating signals.

Thus, it is intended that the present invention cover the modifications and the variations of this invention provided they come within the scope of the appended claims and their equivalents.

What is claimed is:

1. A control circuit for selectively driving into conduction power semiconductor devices coupled between a polyphase AC power source and an electrical load in order to regulate power flow from the AC power source to the load according to a DC control voltage, each said semiconductor device being driven into a conduction mode by applying a driving signal to a control terminal of each respective semiconductor device, said control circuit comprising:

reference voltage means coupled to the polyphase source for generating a reference voltage waveform corresponding to a selected phase of the polyphase source, said reference voltage waveform having a predetermined phase relation to the selected phase of the polyphase source;

means, coupled to said reference voltage means, for generating a square wave signal in phase with the reference voltage waveform;

a phase-locked loop coupled to receive said square wave signal and provide a timing reference signal in phase with said square wave signal, said timing signal having a frequency that is a predetermined multiple of the frequency of the polyphase source;

ramp forming means coupled to said square wave signal generating means for generating a single ramp-shaped voltage signal in phase with the selected phase of the polyphase source;

means for comparing said single ramp-shaped signal and the DC control voltage and generating during each cycle of said ramp-shaped signal a data pulse having a duration corresponding to a predetermined relationship between said ramp-shaped signal and the DC control voltage, said data pulse being a driving signal associated with the selected phase; and shift register means, coupled to receive said data pulses from said comparing means and said timing signal from said phase-locked loop, for generating a plurality of driving signals respectively associated with remaining phases of the polyphase source exclusive of the selected phase, each of the plurality of driving signals being generated in accordance with said timing signal to have a predetermined phase delay relative to the received data pulse and corresponding to the remaining phase of the source with which that driving signal is associated.

2. The control circuit of claim 1 further comprising bandpass filter means coupled with said reference voltage means for minimizing undesirable harmonics and transient voltages that may be present in said reference voltage waveform.

3. The control circuit of claim 2 wherein a positive half cycle driving signal and a negative half cycle driving signal are associated with each phase of the source;

successive data pulses generated by said comparing means alternately being the driving signals associated with the positive and negative half cycles of the selected phase;

said control circuit including separator means, coupled to said comparing means, for separately providing the respective driving signals associated with the positive and negative half cycles of the selected phase;

said shift register means comprising a first shift register coupled to receive the positive half cycle driving signal of the selected phase as a data input and a second shift register coupled to receive the negative half cycle driving signal of the selected phase as a data input, said first and second shift registers each being coupled to receive said timing signal as a clock input; and the driving signals associated with the remaining phases of the source being respectively provided on predetermined outputs of said first and second shift registers.

4. The control circuit of claim 2 wherein a positive half cycle driving signal and a negative half cycle driving signal are associated with each phase of the source;

said shift register means including two separate driving signal outputs associated with each of the remaining phases of the polyphase source, the positive and negative half cycle driving signals associated with each remaining phase respectively being provided on the two shift register means driving signal outputs associated with that remaining phase;

said data pulse being the driving signal associated with the positive half cycle of the selected phase; and said shift register means including an additional output on which the selected phase negative half cycle driving signal is provided.

5. The control circuit of claim 2 wherein a positive half cycle driving signal and a negative half cycle driving signal are associated with each phase of the source;

said shift register means including two separate driving signal outputs associated with each of the remaining phases of the polyphase source, the positive and negative half cycle driving signals associated with each remaining phase respectively being provided on the two shift register means driving signal outputs associated with that remaining phase;

said data pulse being the driving signal associated with the positive half cycle of the selected phase; and said shift register means including two additional outputs on which are respectively provided the selected phase positive and negative half cycle driving signals.

6. A control circuit for selectively driving into conduction power semiconductor devices coupled between a three phase AC power source and an electrical load in order to regulate power flow from the AC power source to the load according to a DC control voltage, each said semiconductor device being driven into a conduction mode by applying a driving signal to a control terminal of each respective semiconductor device, said control circuit comprising:

reference voltage means for generating a reference voltage waveform corresponding to a selected phase of the three phase source, said reference voltage waveform having a predetermined phase relation to the selected phase of the three phase source;

means, coupled to said reference voltage means, for generating a single ramp-shaped voltage signal in phase with the selected phase of the three phase source;

means for comparing said single ramp-shaped signal and the DC control voltage and generating during each cycle of said ramp-shaped signal a data pulse having a duration corresponding to a predetermined relationship between said ramp signal and the DC control voltage, successive pulses generated by said comparing means alternately being the driving signals associated with a positive and a negative half cycle of the selected phase;

separator means responsive to the successive data pulses generated by said comparing means for separately providing the driving signals respectively associated with the positive and negative half cycles of the selected phase; and shift register means, coupled with said separator means to receive the driving signals respectively associated with the positive and negative half cycles of the selected phase, for generating a positive half cycle and negative half cycle driving signal for each remaining phase of the three phase source exclusive of the selected phase, each said driving signal having a predetermined phase delay corresponding to the remaining phase of the source with which that driving signal is associated.

7. The control circuit of claim 6 further comprising bandpass filter means coupled with said reference voltage means for minimizing undesirable harmonics and transient voltages that may be present in said reference voltage waveform.

8. The control circuit of claim 7 further including:
means, coupled to said filter means, for generating a square wave signal in phase with the reference voltage waveform;
a phase-locked loop coupled to receive said square wave signal and provide a timing reference signal in phase with said square wave signal, said timing signal having a frequency that is a predetermined multiple of a source frequency of the three phase source; and
said shift register means being coupled to receive said timing signal and generating each said driving signal in accordance with said timing signal.

9. The control circuit of claim 8 further including counter means for providing a plurality of counter signals each having respective frequencies that are predetermined fractions of the frequency of the timing signal;
means, coupled to said counter means, for generating a ramp reset signal; and
said ramp-shaped signal generating means responsive to each said ramp reset signal to reset the ramp-shaped signal generated thereby.

10. The control circuit of claim 8 wherein said shift register means comprises a first shift register coupled to receive positive half cycle driving signals as data inputs and a second shift register coupled to receive negative half cycle driving signals as data inputs, said first and second shift registers each being operatively coupled to receive said timing signal as a clock input.

11. The control circuit of claim 10 wherein said ramp generating means generates a ramp-shaped analog signal which occurs during each half cycle of the selected phase of said three phase source, each said ramp-shaped analog signal commencing at a peak value and decaying thereafter, said comparing means generating said data pulses such that each said data pulse has a duration corresponding to the period during which said ramp-shaped analog signal has a lower voltage value than said DC control voltage.

12. The control circuit of claim 11 wherein said positive and negative half cycle driving signals for the selected phase each have a duration substantially the same as the duration of said data pulse; and
each remaining phase driving signal has a duration substantially the same as the selected phase driving signal applied as the data input to the one of said first and second shift registers providing the remaining phase driving signals.

13. The control circuit of claim 6 wherein said ramp generating means generates a ramp-shaped analog signal which occurs during each half cycle of the selected phase of the three phase source, each said ramp-shaped analog signal commencing at a peak value and decaying thereafter.

14. The control circuit of claim 13 wherein said comparing means generates said data pulses such that each said data pulse has a duration corresponding to the period during which said ramp-shaped analog signal has a lower voltage value than said DC control voltage; and
said positive and negative half cycle driving signals for the selected phase each having a duration substantially the same as the duration of said data pulse.

15. The control circuit of claim 6 wherein the selected phase lags said reference voltage waveform by 30°.

16. The control circuit of claim 6 wherein the selected phase is in phase with said reference voltage waveform.

17. The control circuit of claim 6 wherein the power semiconductor devices are configured to form an AC switch circuit.

18. The control circuit of claim 6 wherein the power semiconductor devices are configured to form a full-wave bridge rectifier circuit.

19. A control circuit for selectively driving into conduction power semiconductor devices coupled between a three phase AC power source and an electrical load in order to regulate power flow from the AC power source to the load according to a DC control voltage, each said semiconductor device being driven into a conduction mode by applying a signal to a control terminal of each respective semiconductor device, said control circuit comprising:
reference voltage means for generating a reference voltage waveform corresponding to a selected phase of the three phase source, said reference voltage waveform having a predetermined phase relation to the three phase source selected phase;
means, coupled to said reference voltage means, for generating a single ramp-shaped voltage signal in phase with the selected phase of the three phase source.
means for comparing the ramp-shaped signal and the DC control voltage and generating during each cycle of said ramp-shaped signal a data pulse having a duration corresponding to a predetermined relationship between said ramp-shaped signal and the DC control voltage, said data pulse being the driving signal associated with the positive half cycle of the selected phase; and
shift register means, coupled with said comparing means, for generating a positive half cycle and negative half cycle driving signal for each of the remaining phases of the three phase source exclusive of the selected phase, each said driving signal having a predetermined phase delay relative to said data pulse, said delay means also generating the negative half cycle driving signal associated with the selected phase.

20. The control circuit of claim 19 further comprising band-pass filter means coupled with said reference voltage means for minimizing undesirable harmonics and transient voltages that may be present in said reference voltage waveform.

21. The control circuit of claim 20 further including:
means, coupled to said filter means, for generating a square wave signal in phase with said reference voltage waveform;

a phase-locked loop coupled to receive said square wave signal and provide a timing reference signal in phase with said square wave signal, said timing signal having a frequency that is a predetermined multiple of a source frequency of the three phase source; and said shift register means coupled to receive said timing signal and generating each said driving signal in accordance with said timing signal.

22. The control circuit of claim 21 wherein said square wave signal is applied to said ramp-shaped signal generating means as a ramp reset signal; and said ramp-shaped signal generating means being responsive to each said ramp reset signal to reset the ramp-shaped signal generated thereby.

23. The control circuit of claim 22 wherein said shift register means is coupled to receive said data pulse as a data input and said timing signal as a clock input; and the driving signals associated with the remaining phases of the source and the negative half cycle of the selected phase being respectively provided on predetermined outputs of said shift register means.

24. The control circuit of claim 23 wherein said data pulse is provided on an additional output of said shift register means as the positive half cycle driving signal of the selected phase.

25. The control circuit of claim 19 wherein said ramp-shaped signal only occurs during each positive half cycle of the selected phase, each said ramp-shaped signal commencing at a peak value and decaying thereafter.

26. The control circuit of claim 25 wherein said comparing means generates said data pulses such that each said data pulse has a duration corresponding to the period during which said ramp-shaped analog signal has a lower voltage value than said DC control voltage.

27. The control circuit of claim 26 wherein said shift register means is coupled to receive said data pulse as a data input and said timing signal as a clock input;

the driving signals associated with the remaining phases of the source and the negative half cycle of the selected phase being respectively provided on predetermined outputs of the shift register means and each corresponding to one of said data pulses received as the shift register data input; and the respective duration of each remaining phase driving signal and the driving signal for the negative half cycle of the selected phase being substantially the same as its corresponding data pulse.

28. The control circuit of claim 19 wherein the selected phase lags said reference voltage waveform by 30°.

29. The control circuit of claim 19 wherein the selected phase is in phase with said reference voltage waveform.

30. The control circuit of claim 19 wherein the power semiconductor devices are configured to form an AC switch circuit.

31. The control circuit of claim 19 wherein the power semiconductor devices are configured to form a full-wave bridge rectifier circuit.

32. A control circuit for selectively driving into conduction three-terminal power semiconductor devices coupled between a three phase AC power source and an electrical load in order to regulate power flow from the AC power source to the load according to a DC control voltage, each said semiconductor device being driven into a conduction mode by applying a driving signal to a control terminal of each respective semiconductor device, said control circuit comprising:

reference voltage means coupled to the three phase source for generating a reference voltage waveform corresponding to a selected phase of the three phase source, said reference voltage waveform having a predetermined phase relation the selected phase of the three phase source;

band-pass filter means for filtering said reference voltage waveform to minimize undesirable harmonic and transient voltages that may be present in said reference voltage waveform;

means, coupled to said filter means for generating a square wave signal in phase with the reference voltage waveform;

a phase-locked loop coupled to receive said square wave signal and provide a timing reference signal in phase with said square wave signal, said timing signal having a frequency that is a predetermined multiple of a source frequency of the three phase source;

counter means, coupled to receive said timing signal, for providing a plurality of counter output signals each having a different frequency that is a predetermined fraction of the timing signal frequency, said phase-locked loop being coupled to receive as a feedback signal the counter output signal having the source frequency;

logic means, coupled to receive said plurality of counter output signals, for generating a ramp reset signal in phase with the selected phase of the three phase source and for generating a steering signal;

means, coupled to receive said ramp reset signal, for generating a single ramp-shaped voltage signal in phase with the selected phase of the three phase source;

means for comparing said single ramp-shaped signal and the DC control voltage and generating during each cycle of said ramp-shaped signal a data pulse having a duration corresponding to a predetermined relationship between said ramp signal and the DC control voltage, successive pulses generated by said comparing means alternately being the driving signals associated with a positive and a negative half cycle of the selected phase;

separator means, responsive to said steering signal and the successive data pulses generated by said comparing means, for separately providing the driving signals respectively associated with the positive and negative half cycles of the selected phase;

first shift register means coupled to receive said positive half cycle driving signals as data inputs and said timing signal as a clock input;

second shift register means coupled to receive said negative half cycle driving signals as data inputs and said timing signal as a clock input; and said first and second shift register means generating, on respective outputs thereof, positive and negative half cycle driving signals for each remaining phase of the three phase source exclusive of the selected phase.

* * * * *